(12) United States Patent
Madsen et al.

(10) Patent No.: US 10,705,022 B2
(45) Date of Patent: Jul. 7, 2020

(54) ROBUST SPECTROSCOPY SYSTEMS

(71) Applicant: Goodrich Corporation, Charlotte, NC (US)

(72) Inventors: David Madsen, Southbury, CT (US); Alexander J. Majewski, Fairfield, CT (US)

(73) Assignee: Goodrich Corporation, Charlotte, NC (US)

( * ) Notice: Subject to any disclaimer, the term of this patent is extended or adjusted under 35 U.S.C. 154(b) by 441 days.

(21) Appl. No.: 15/245,590

(22) Filed: Aug. 24, 2016

(65) Prior Publication Data

US 2018/0059024 A1    Mar. 1, 2018

(51) Int. Cl.
| | |
|---|---|
| *G01N 21/65* | (2006.01) |
| *G01J 3/02* | (2006.01) |
| *G01J 3/44* | (2006.01) |
| *B60R 11/00* | (2006.01) |
| *G01J 1/42* | (2006.01) |

(52) U.S. Cl.
CPC .............. *G01N 21/65* (2013.01); *B60R 11/00* (2013.01); *G01J 1/4257* (2013.01); *G01J 3/021* (2013.01); *G01J 3/0208* (2013.01); *G01J 3/0229* (2013.01); *G01J 3/44* (2013.01); *B60R 2011/004* (2013.01); *G01N 2201/0216* (2013.01); *G01N 2201/08* (2013.01)

(58) Field of Classification Search
CPC ........... G01N 21/65; G01N 2201/0636; G01N 2201/0216; G01N 2201/0633; G01J 3/44; G01J 1/4257; G01J 3/0208; G01J 3/021; G01J 3/0229

See application file for complete search history.

(56) References Cited

U.S. PATENT DOCUMENTS

| | | | | |
|---|---|---|---|---|
| 4,598,997 A | * | 7/1986 | Steigmeier | G01N 21/94 |
| | | | | 250/559.41 |
| 6,788,407 B1 | * | 9/2004 | Higdon | G01N 21/65 |
| | | | | 356/301 |
| 7,623,234 B2 | * | 11/2009 | Puzey | C12Q 1/04 |
| | | | | 356/326 |
| 7,760,352 B2 | | 7/2010 | Armstrong et al. | |
| 8,125,627 B2 | * | 2/2012 | Dottery | G01J 3/443 |
| | | | | 356/301 |

(Continued)

*Primary Examiner* — Violeta A Prieto
(74) *Attorney, Agent, or Firm* — Locke Lord LLP; Daniel J. Fiorello; Scott D. Wofsy

(57) ABSTRACT

An optical head for a Raman spectroscopy system includes a housing an input configured to allow input radiation of a selected wavelength into the housing, a first lens disposed in an end of the housing to allow the input radiation to emit from the housing through the first lens and to receive reflected radiation including specular reflection and diffuse reflection, and a second lens disposed in the housing and configured to receive reflected radiation from the first lens. The optical head includes an output configured to receive the reflected radiation from the second lens. The optical head includes a blocking mirror disposed in the housing between the first lens and the second lens. The blocking mirror is configured and positioned to direct the radiation from the input to the first lens. The blocking mirror blocks at least a portion of specular reflection from reaching the second lens but allows diffuse reflection to the reach the second lens.

20 Claims, 5 Drawing Sheets

(56) References Cited

U.S. PATENT DOCUMENTS

| | | | |
|---|---|---|---|
| 8,138,488 B2* | 3/2012 | Grot | G06F 3/0317 |
| | | | 250/208.1 |
| 8,947,659 B1 | 2/2015 | Baastians et al. | |
| 9,036,145 B2 | 5/2015 | Froigneux et al. | |
| 9,157,801 B2* | 10/2015 | Dottery | G01J 3/44 |
| 2007/0229833 A1* | 10/2007 | Rosencwaig | G01B 11/303 |
| | | | 356/426 |
| 2009/0108175 A1* | 4/2009 | Grot | G06F 3/0317 |
| | | | 250/206.1 |
| 2010/0085567 A1* | 4/2010 | Dottery | G01J 3/443 |
| | | | 356/301 |
| 2013/0293882 A1* | 11/2013 | Dottery | G01J 3/44 |
| | | | 356/301 |
| 2013/0314528 A1 | 11/2013 | Ozanam et al. | |
| 2014/0192355 A1* | 7/2014 | Froigneux | G01J 3/0208 |
| | | | 356/301 |
| 2016/0041092 A1* | 2/2016 | Urano | G01N 21/95623 |
| | | | 356/237.5 |
| 2016/0177366 A1* | 6/2016 | Auner | G01J 3/44 |
| | | | 435/5 |
| 2017/0363414 A1* | 12/2017 | Dunn | G01B 11/306 |
| 2018/0209909 A1* | 7/2018 | Jian | G01J 3/021 |

\* cited by examiner

ROBUST SPECTROSCOPY SYSTEMS

BACKGROUND

1. Field

The present disclosure relates to spectroscopy, more specifically to Raman spectroscopy systems.

2. Description of Related Art

Raman spectroscopy presently requires sensitive laboratory based optics. These complex optics (telescopes, beam splitters, etc.) are fragile and cannot be used in a rough environment (e.g., for vehicles).

Such conventional methods and systems have generally been considered satisfactory for their intended purpose. However, there is still a need in the art for robust Raman spectroscopy systems. The present disclosure provides a solution for this need.

SUMMARY

An optical head for a Raman spectroscopy system includes a housing, an input configured to allow input radiation of a selected wavelength into the housing, a first lens disposed in an end of the housing to allow the input radiation to emit from the housing through the first lens and to receive reflected radiation including specular reflection and diffuse reflection, and a second lens disposed in the housing and configured to receive reflected radiation from the first lens. The optical head includes an output configured to receive the reflected radiation from the second lens. The optical head includes a blocking mirror disposed in the housing between the first lens and the second lens. The blocking mirror is configured and positioned to direct the radiation from the input to the first lens. The blocking mirror blocks at least a portion of specular reflection from reaching the second lens but allows diffuse reflection to the reach the second lens.

The blocking mirror may be a parabolic blocking mirror configured to collimate the input radiation, for example. In certain embodiments, the blocking mirror is a 90 degree blocking mirror configured to direct the input radiation 90 degrees from an input direction.

The first lens can be configured to focus the input radiation and collimate the reflected radiation. The first and/or second lens can include fused silica, for example. Any other suitable material is contemplated herein. The predetermined wavelength can be about 355 nanometers, or any other suitable wavelength.

The output can be off-axis from the second lens. In such embodiments, the optical head can include a second mirror configured to direct the reflected radiation from the second lens to the output. The second lens can be configured to direct the reflected radiation on the second mirror.

The input and the output can include optical couplings configured to connect to fiber optic cables. In certain embodiments, the blocking mirror can be configured to be offset from a central axis to allow specular reflection past the blocking mirror.

A vehicle can include an optical head for Raman spectroscopy mounted to the vehicle in accordance with any suitable embodiment as described herein. The vehicle can include a radiation source optically connected to the input of the optical head to supply the input radiation to the optical head and a radiation receiver optically connected to the output of the optical head to receive the reflected radiation and to determine one or more properties of a target based on the reflected radiation. In certain embodiments, the optical head is mounted on a rear of the vehicle.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
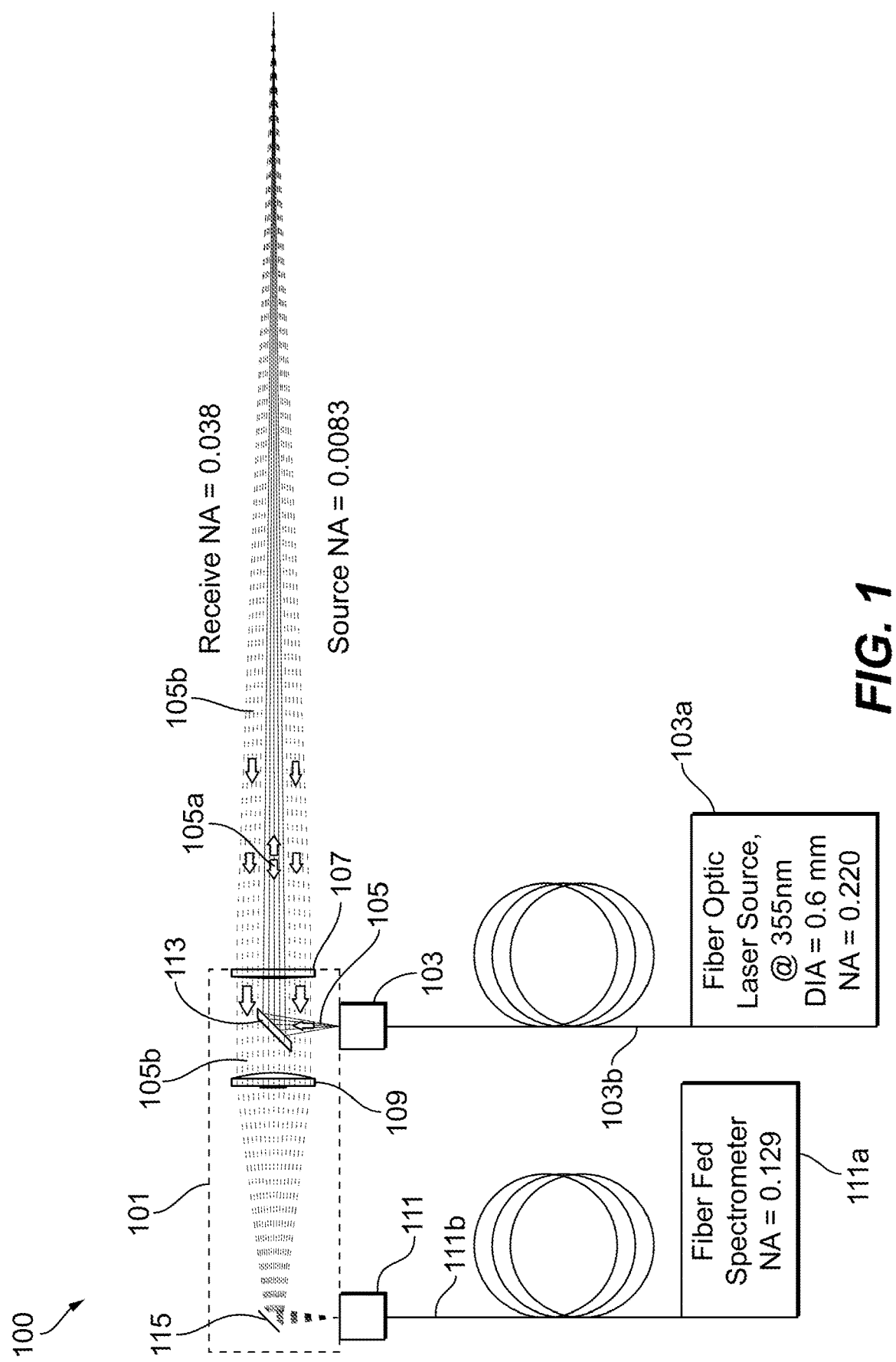
FIG. 1 is a cross-sectional, schematic view of an embodiment of an optical head in accordance with this disclosure.

Reference will now be made to the drawings wherein like reference numerals identify similar structural features or aspects of the subject disclosure. For purposes of explanation and illustration, and not limitation, an illustrative view of an embodiment of an optical head in accordance with the disclosure is shown in FIG. 1 and is designated generally by reference character 100. Other embodiments and/or aspects of this disclosure are shown in FIGS. 2A-4. The systems and methods described herein can be used to enable Raman spectroscopy in harsh environments (e.g., on vehicles).

Referring to FIG. 1, an optical head for a Raman spectroscopy system includes a housing 101 and an input 103 configured to allow input radiation 105 of a selected wavelength (e.g., about 355 nm or any other suitable wavelength and/or range) into the housing 101. The housing 101 can be any suitable size and/or shape, and can be made of any suitable material (e.g., metal).

A first lens 107 is disposed in an end of the housing 101 to allow the input radiation 105 to emit from the housing 101 through the first lens 107. The first lens 107 is also configured to receive reflected radiation including specular reflection 105*a* and diffuse reflection 105*b*. The first lens 107 can include any suitable size (e.g., about 114 mm diameter), have any suitable shape (e.g., aspheric, spherical), have any suitable effective focal length (e.g., about 1500 mm), can be made of any suitable material (e.g., fused silica), and/or can include any other suitable optical characteristic.

In certain embodiments, the first lens 107 can be configured to focus the input radiation 105 (e.g., to a spot size of 18 mm, 15 mm, or any other suitable spot size). The first lens 107 can also be configured to collimate the reflected radiation 105a, 105b.

A second lens 109 is disposed in the housing 101 and configured to receive reflected radiation from the first lens. The second lens 109 can include any suitable size (e.g., about 114 mm diameter), have any suitable shape (e.g., aspheric, spherical), have any suitable effective focal length (e.g., about 443.32 mm), can be made of any suitable material (e.g., fused silica), and/or can include any other suitable optical characteristic. In certain embodiments as shown, the second lens 109 can be the same diameter as the first lens 107. The first and/or second lens 107, 109 can include any suitable optical coating to improve signal to noise ratio as appreciated by those skilled in the art.

The optical head 100 includes an output 111 configured to receive the reflected radiation from the second lens 109. The input 103 and the output 111 can include any suitable optical couplings configured to connect to any suitable fiber optic cables, for example, or any other suitable device (e.g., a CCD for the output 111 and a laser for the input 103) and/or waveguide. As shown in FIG. 1, the input 103 can be connected to a radiation source 103a via a fiber optic cable 103b, and the output 111 can be connected to a radiation receiver 111a (e.g. a spectrometer) via a fiber optic cable 111b.

The optical head 100 includes a blocking mirror 113 disposed in the housing 101 between the first lens 107 and the second lens 109. The blocking mirror 113 is configured and positioned to direct the radiation 105 from the input to the first lens 107. The blocking mirror 113 can be on-axis (e.g., centered on along a center line of the first lens 107), off-axis, and/or moveable between an on-axis position and an off-axis position.

The blocking mirror 113 blocks at least a portion of specular reflection 105a from reaching the second lens 109 but allows diffuse reflection 105b to the reach the second lens 109. In this respect, the blocking mirror 113 can have any suitable shape (e.g., parabolic), size (e.g., a diameter of about 25 mm), effective focal length (e.g., about 50 mm, about 100 mm), numerical aperture (NA) (e.g., about 0.25, about 0.24), material (e.g., silver), and/or any other suitable optical characteristic (e.g., to create a predetermined spot size at a predetermined distance).

In certain embodiments, as shown in FIG. 1, the blocking mirror 113 may be a parabolic mirror configured to collimate the input radiation 105. In certain embodiments, the blocking mirror 113 is a 90 degree mirror configured to direct the input radiation 113 about 90 degrees from an input direction. Any other suitable angle of redirection is contemplated herein.

As shown, the blocking mirror 113 can be positioned along a central axis of the optical head 100 such that the mirror 113 directs input radiation 105 to the center of the first lens 107 and thus receives and blocks all specular reflection 105a from passing to the second lens 109. In certain embodiments, the blocking mirror 113 can be configured to be offset from a central axis to allow specular reflection 105a past the blocking mirror 113. In this regard, the blocking mirror 113 can be connected to a suitable actuator to move the blocking mirror 113 closer to and/or further from input 103 as desired.

It is also contemplated that the blocking mirror 113 can be permanently set to be offset from a central axis such that at least some specular reflection 105a passes the blocking mirror 113. In certain embodiments, the optical head 100 can include a filter configured to block specular reflection 105a from reaching the output 111.

In certain embodiments, the output 111 can be off-axis from the second lens 109. In such embodiments, the optical head 100 can include a second mirror 115 (e.g., located on-axis to the second lens 109) configured to direct the reflected radiation (e.g., the diffuse reflection 105b) from the second lens 109 to the output 111. The second mirror 115 can redirect the reflected radiation in at any suitable angle (e.g., 90 degrees). The second mirror 115 can include in suitable size, shape (e.g., flat as shown), and/or material (e.g., silver), and/or any other suitable optical characteristic.

As shown, the second lens 109 can be configured to direct the reflected radiation onto the second mirror 115. The amount of focus of the second lens 109 can be dictated by NA of output (e.g., which can be about 0.129 in certain embodiments of fiber 111b and/or the radiation receiver 111a). The second mirror 115 is optional as the radiation emitted from the second lens 109 can be fed directly to the output 111.

Figure 2A:
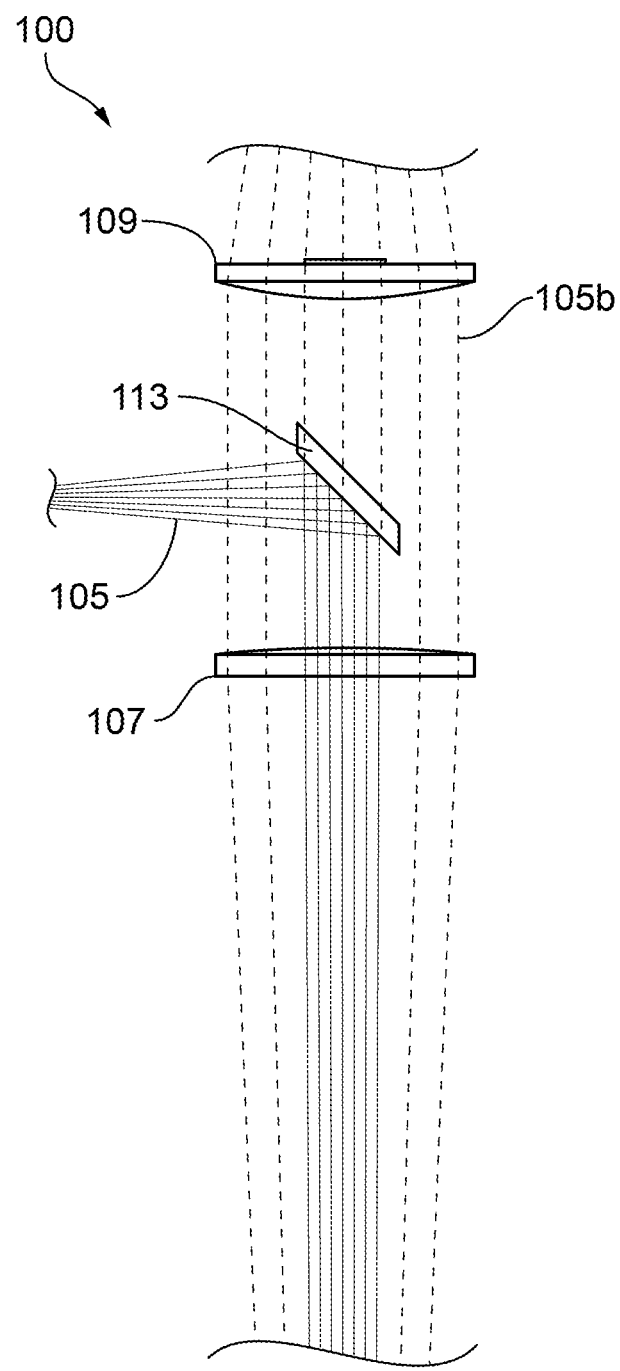
FIG. 2A is a is a cross-sectional, schematic view of an embodiment of an optical head in accordance with this disclosure, shown operating normal to a target.
Figure 2B:
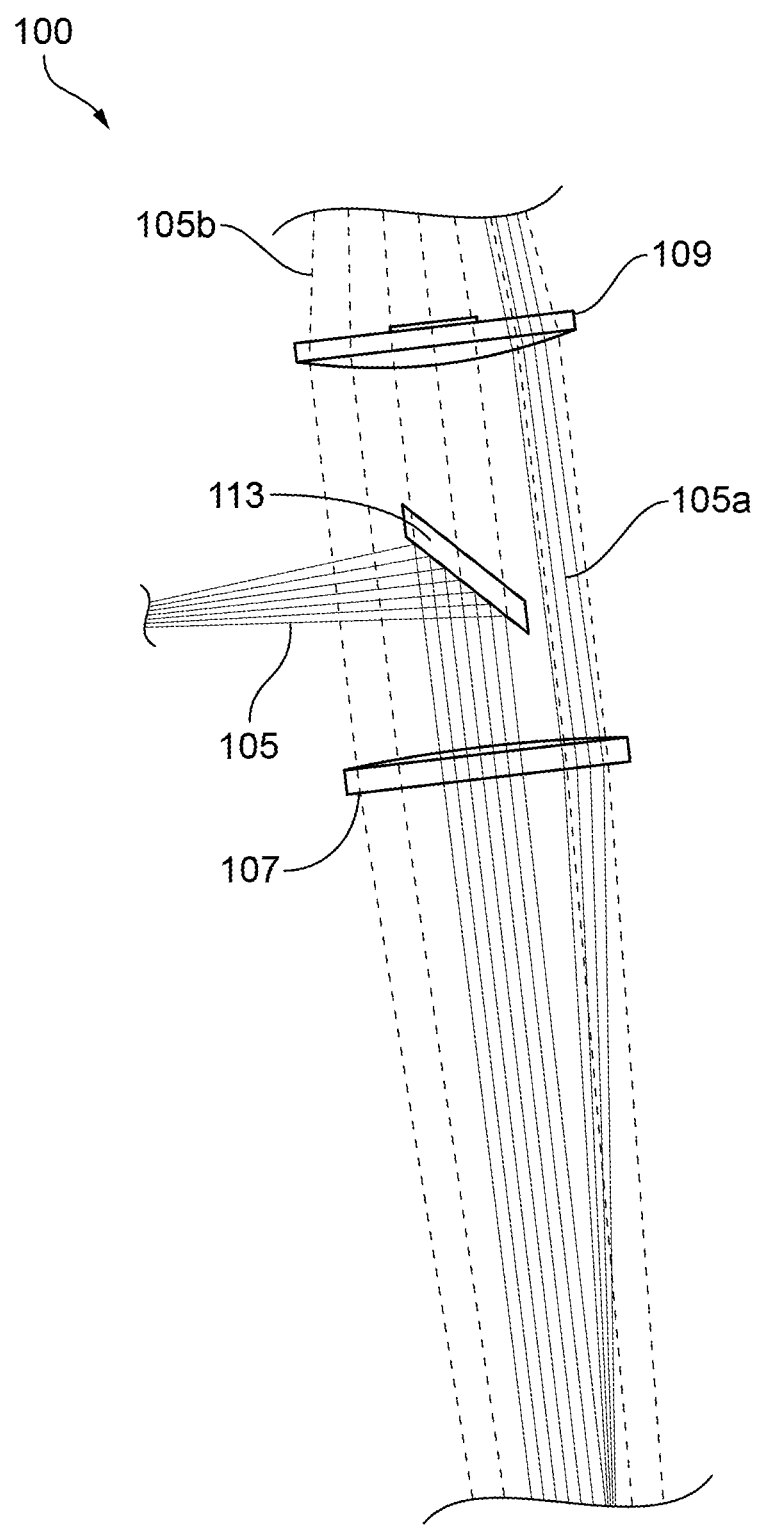
FIG. 2B is a is a cross-sectional, schematic view of an embodiment of an optical head in accordance with this disclosure, shown operating at a non-right angle relative to a target.
Figure 2C:
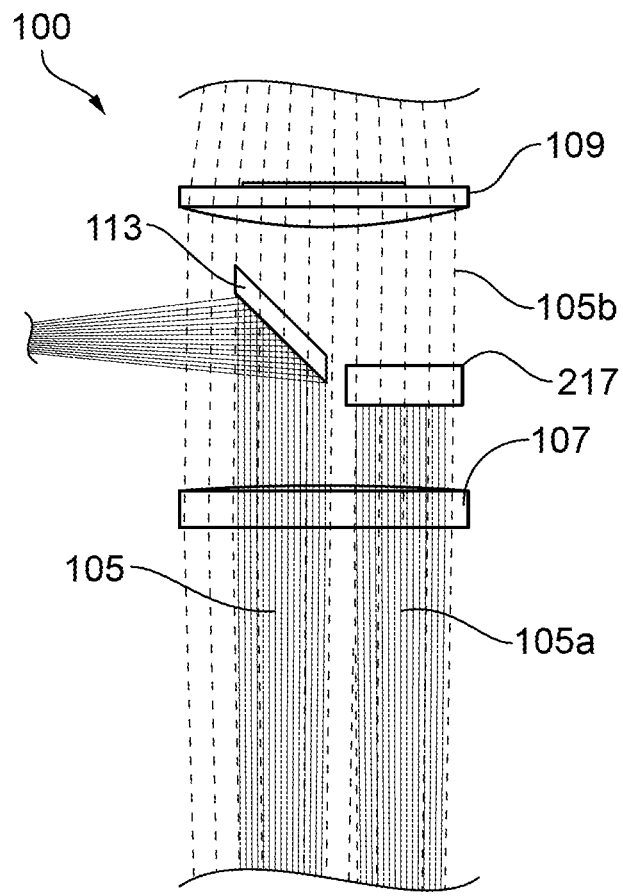
FIG. 2C is a is a cross-sectional, schematic view of an embodiment of an optical head in accordance with this disclosure, shown operating with an offset blocking mirror and with an optional specular reflection filter.

Referring to FIGS. 2A, 2B, and 2C, varying operational modes are shown of an optical head 100. For example, FIG. 2A shows the optical head 100 operating at a normal angle to a target such that the specular reflection 105a is blocked by the blocking mirror 113. FIG. 2B shows the optical head 100 operating at a non-right angle relative to a target to cause some portion of the specular reflection 105a to reflect past the blocking mirror 113. FIG. 2C shows an embodiment of an optical head 100 operating having the blocking mirror 113 offset from the center axis of the optical head 100, however, with a suitable filter 217 which is configured to block the specular reflection 105a as appreciated by those skilled in the art.

Figure 3:
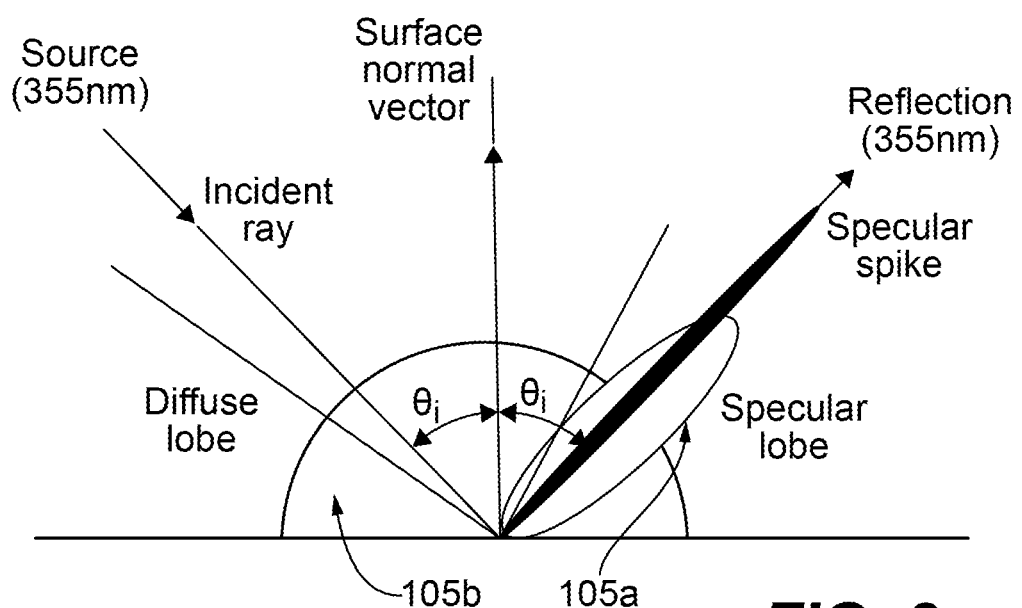
FIG. 3 is a diagram of the relationship between specular reflection and diffuse reflection as a function of incident ray angle $\theta_i$ relative to a surface normal vector.

For context, FIG. 3 diagrammatically shows the relationship between specular reflection 105a and diffuse reflection 105b as a function of incident ray angle $\theta_i$ relative to a surface normal vector. As shown, there is a specular lobe of radiation surrounding the specular spike, and all other radiation being part of the diffuse lobe.

Figure 4:
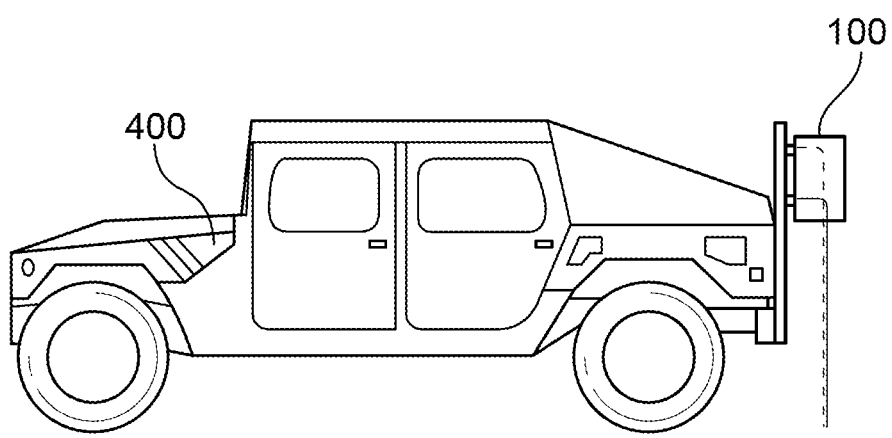
FIG. 4 is a side view of an embodiment of a vehicle in accordance with this disclosure.

Referring additionally to FIG. 4, a vehicle 400 (e.g., a land vehicle) can include an optical head 100 for Raman spectroscopy mounted to the vehicle 400. The optical head 100 can be any suitable embodiment as described herein. The vehicle 400 can include a radiation source 103a optically connected to the input 103 of the optical head 100 to supply the input radiation 105 to the optical head 100. The vehicle 400 can also include a radiation receiver 111a (e.g., a spectrometer) optically connected to the output 111 of the optical head 100 to receive the reflected radiation and to determine one or more properties of a target based on the reflected radiation. The radiation source 103a and/or the radiation receiver 111a can be within the vehicle 400 and/or actively cooled/controlled in any suitable manner.

In certain embodiments, the optical head 100 can be mounted on a rear of the vehicle 400 (e.g., and pointed down to the ground at a 90 degree angle) as shown. Any other suitable position to mount the optical head 100 is contemplated herein. For example, the optical head 100 can be mounted on a tilting assembly to tilt the entire head 100.

As described above, embodiments provide a passive, remote optical head 100 having minimal components and that is robust and can withstand the rough environment mounted to a vehicle. Prior to the disclosed embodiments, Raman spectrometers were a precarious table top lab experiment not suitable for field applications. Traditional spectrometer systems have poor efficiency, optics that are not matched to required NAs, and are built around a sensitive telescope. For example, traditional spectrometers using a beam splitter have a source-to-spectrometer efficiency of about 25%, whereas certain embodiments as described above include a source-to-spectrometer efficiency of about 95%. Traditional systems have an output NA of 0.220 (which is very expensive and complex) for both the source and receive optical paths, whereas certain embodiments as described above have an NA of about 0.129 (which is less expensive, simple, and allows the source to have separate NA of 0.220 with a simple mirror).

Also, traditional systems have no specular reflection blocking, whereas embodiments include specular reflection blocking as well as the ability to fine tune around bulk diffuse reflection propagating around the specular return. As appreciated by those having ordinary skill in the art, bulk diffuse reflection contains desired Raman shift in wavelength for analysis.

The methods and systems of the present disclosure, as described above and shown in the drawings, provide for spectroscopy systems with superior properties including robustness, for example. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An optical head for a Raman spectroscopy system, comprising:
   a housing;
   an input configured to allow input radiation of a selected wavelength into the housing;
   a first lens disposed in an end of the housing to allow the input radiation to emit from the housing through the first lens and to receive reflected radiation including specular reflection and diffuse reflection;
   a second lens disposed in the housing and configured to receive the reflected radiation from the first lens;
   a blocking mirror disposed in the housing between the first lens and the second lens, wherein the blocking mirror is configured and positioned to direct the radiation from the input to the first lens, wherein the blocking mirror is configured to block at least a portion of specular reflection from reaching the second lens but to allow diffuse reflection to pass around the blocking mirror to reach the second lens; and
   an output configured to receive the reflected radiation from the second lens.

2. The optical head of claim 1, wherein the blocking mirror is an off-axis parabolic mirror configured to collimate the input radiation.

3. The optical head of claim 1, wherein the blocking mirror is a 90 degree mirror configured to direct the input radiation 90 degrees from an input direction.

4. The optical head of claim 1, wherein the first lens is configured to focus the input radiation and collimate the reflected radiation.

5. The optical head of claim 1, wherein the first lens includes fused silica.

6. The optical head of claim 1, wherein the second lens includes fused silica.

7. The optical head of claim 1, wherein the selected wavelength is about 355 nanometers.

8. The optical head of claim 1, wherein the output is off-axis from the second lens, wherein the optical head further includes a second mirror configured to direct the reflected radiation from the second lens to the output.

9. The optical head of claim 8, wherein the second lens is configured to direct the reflected radiation on the second mirror.

10. The optical head of claim 1, wherein the input and the output include optical couplings configured to connect to fiber optic cables.

11. The optical head of claim 1, wherein the blocking mirror is configured to be offset from a central axis to allow specular reflection past the blocking mirror.

12. A vehicle, comprising:
    an optical head for Raman spectroscopy mounted to the vehicle, comprising:
       a housing;
       an input configured to allow input radiation of a selected wavelength into the housing;
       a first lens disposed in an end of the housing to allow the input radiation to emit from the housing through the first lens and to receive reflected radiation including specular reflection and diffuse reflection;
       a second lens disposed in the housing and configured to receive the reflected radiation from the first lens;
       a blocking mirror disposed in the housing between the first lens and the second lens, wherein the blocking mirror is configured and positioned to direct the radiation from the input to the first lens, wherein the blocking mirror is configured to block at least a portion of specular reflection from reaching the second lens but to allow diffuse reflection to pass around the blocking mirror to reach the second lens; and
       an output configured to receive the reflected radiation from the second lens;
    a radiation source optically connected to the input of the optical head to supply the input radiation to the optical head; and
    a radiation receiver optically connected to the output of the optical head to receive the reflected radiation and to determine one or more properties of a target based on the reflected radiation.

13. The vehicle of claim 12, wherein the optical head is mounted on a rear of the vehicle.

14. The vehicle claim 12, wherein the blocking mirror is a parabolic mirror configured to collimate the input radiation.

15. The vehicle claim 12, wherein the blocking mirror is a 90 degree mirror configured to direct the input radiation 90 degrees from an input direction.

16. The vehicle claim 12, wherein the first lens is configured to focus the input radiation and collimate the reflected radiation.

17. The vehicle claim 12, wherein the first lens includes fused silica.

18. The vehicle claim 12, wherein the second lens includes fused silica.

19. The vehicle claim 12, wherein the selected wavelength is about 355 nanometers.

20. The vehicle claim 12, wherein the output is off-axis from the second lens, wherein the optical head further includes a second mirror configured to direct the reflected radiation from the second lens to the output.

* * * * *